United States Patent [19]
Zanni

[11] 3,727,492
[45] Apr. 17, 1973

[54] MACHINE FOR CUTTING AND STRIPPING BACK ELECTRIC WIRES AND CABLES

[75] Inventor: Vincenzo Zanni, Ivrea, Italy

[73] Assignee: Ing. C. Olivetti & Co., S.p.A., Ivrea, Italy

[22] Filed: Mar. 18, 1971

[21] Appl. No.: 125,782

[30] Foreign Application Priority Data

Mar. 21, 1970 Italy.................................67982 A/70

[52] U.S. Cl. ................................................81/9.5 A
[51] Int. Cl. ................................................H02g 1/12
[58] Field of Search ................81/9.51, 9.5 A, 9.5 R; 83/924

[56] References Cited

UNITED STATES PATENTS 3,292,462   12/1966   Turecek et al. ......................81/9.51
3,311,001   3/1967   Gallagher et al. ....................81/9.5 A Primary Examiner—Robert C. Riordon
Assistant Examiner—Roscoe V. Parker
Attorney—Birch, Swindler, McKie & Beckett

[57] ABSTRACT

A hand-held device is disclosed for cutting electrical wires and cables while stripping the sheath from a short section thereof. Two pairs of jaws are provided, the first pair clamping a section of the wire, while the second pair, which is pivotally movable relative to the first pair in the direction of the wire axis, notches and strips the wires sheath, and cuts the wire. The device is powered by compressed air actuated piston.

13 Claims, 9 Drawing Figures

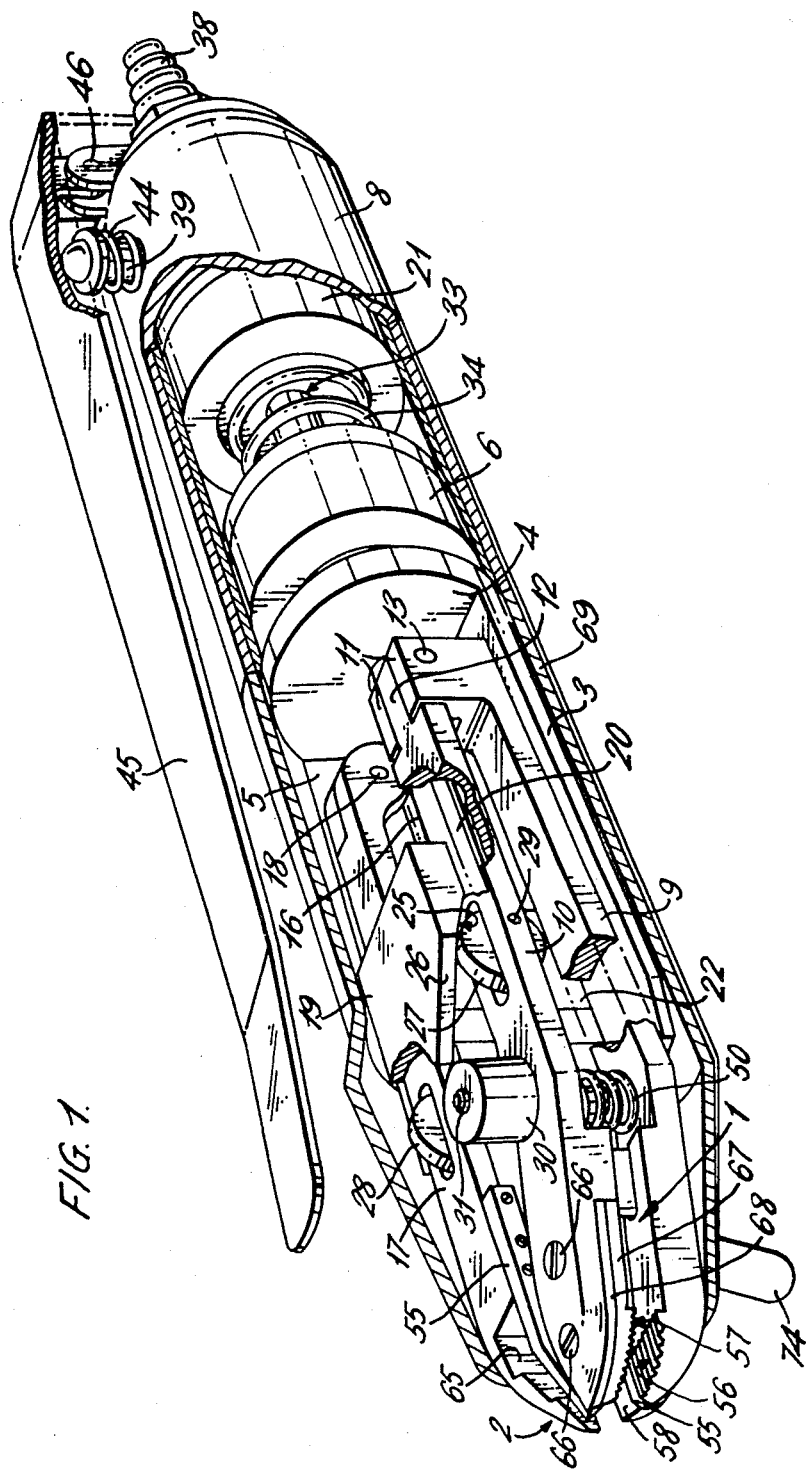

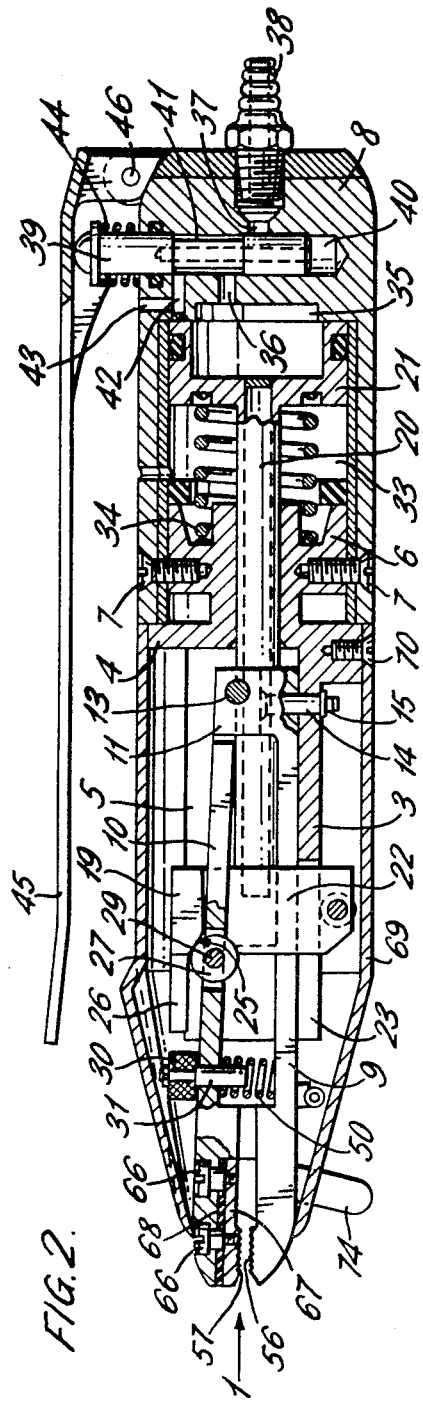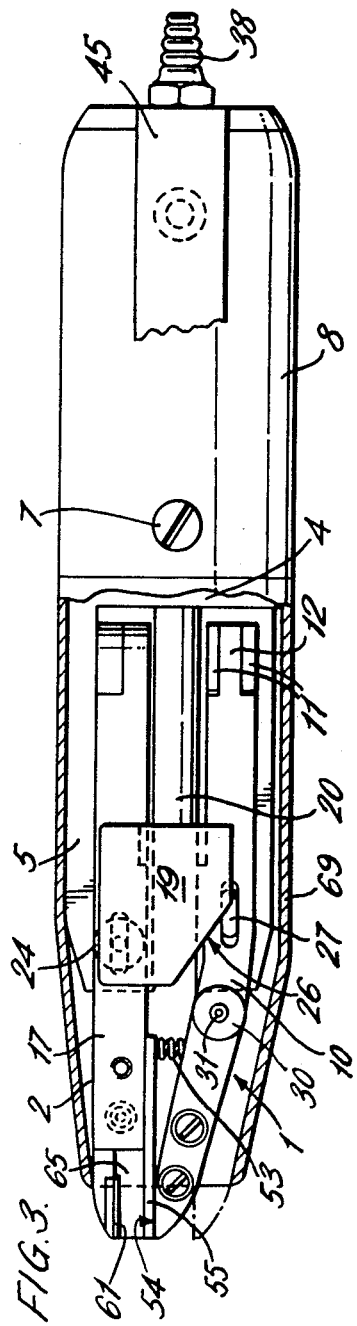

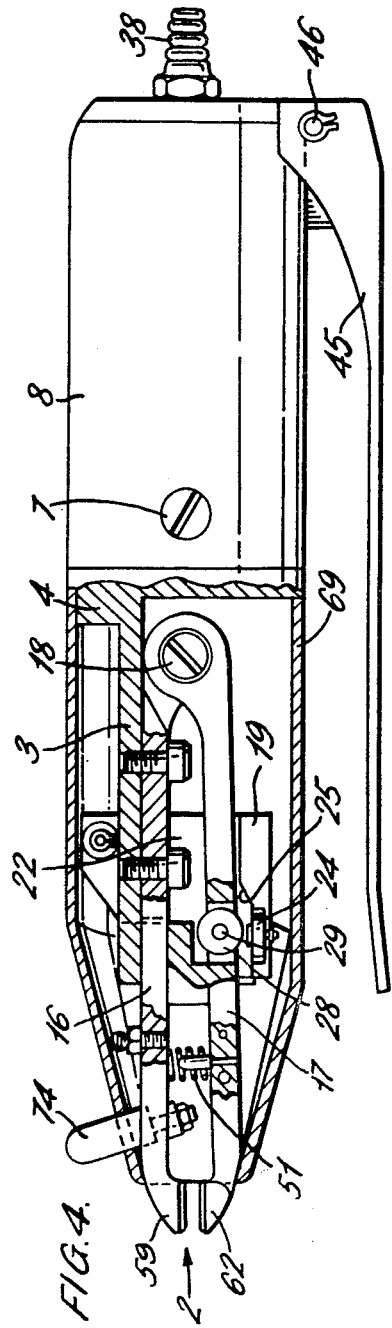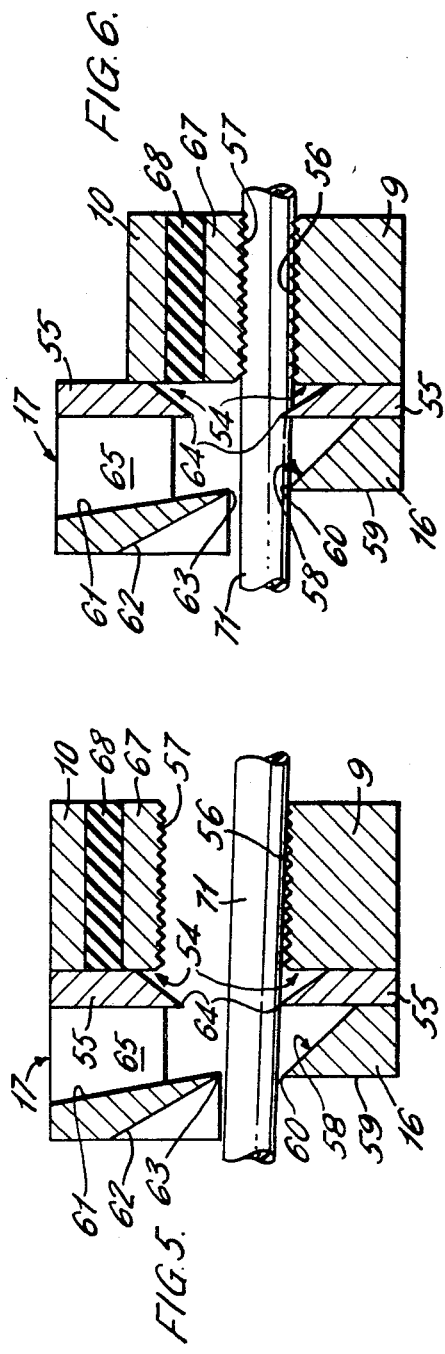

MACHINE FOR CUTTING AND STRIPPING BACK ELECTRIC WIRES AND CABLES

BACKGROUND OF THE INVENTION

This invention relates to a machine for automatically preparing an electric wire or cable for an electrical connection, by stripping the sheath from the end portion thereof.

As is well known, these operations are often carried out by hand, by utilizing very simple implements, such as pliers, cutters, and so on. However, by using these implements only, an extended time is required to carry out the operations and the end portions of the wires are not always stripped back to uniform dimensions.

SUMMARY OF THE INVENTION

The object of the present invention is to avoid the disadvantages enumerated above.

According to the present invention, there is provided a machine for cutting and stripping back electric wires or cables, comprising first and second pairs of jaws disposed side by side, the first jaws being adapted to clamp a section of a wire or cable, the second jaws being adapted to cut the end and to notch the sheath of the wire or cable between the end and the clamped section.

One of the two pairs of jaws can be pivotally mounted relative to the other, in order to enable the pivoted pair to be moved relative to the jaws of the other pair substantially in the direction of the axis of the wire or cable. Means can be provided for actuating, in succession, the closure of the first pair of jaws, then the closure of the second pair of jaws, and finally the pivotal movement of the pivotally mounted pair of jaws.

The invention will be described in more detail, by way of example, with reference to the accompanying drawings, in which:

BRIEF DESCRIPTION OF THE DRAWINGS

FIG. 1 is a perspective view, partly in section, of a machine embodying the invention, wherein the main components can be seen in the rest position;

FIG. 2 is a partial section of the machine of FIG. 1 which shows some inner components in side view;

FIG. 3 is a partial section of the machine of FIG. 2 which shows the inner components in plan view;

FIG. 4 is a partial section of the machine of FIG. 1 which shows the inner components in a side view opposite to that of FIG. 2; and FIGS. 5 to 9 illustrate successive stages of operation of the machine.

DESCRIPTION OF THE PREFERRED EMBODIMENT

Figure 7:
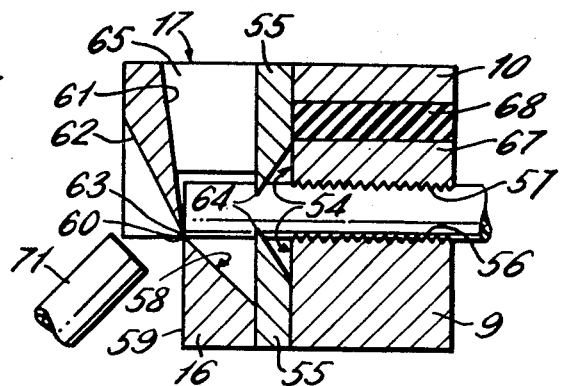

The machine comprises two pairs of jaws, namely clamping jaws 1 and cutting and notching jaws 2. The two sets of jaws are mounted on walls 3 and 5, respectively, of a bracket projecting from a support 4. The support 4 is integral with a cylindrical attachment part 6 to which is fastened, by means of screws 7 (FIG. 2) a cylindrical body 8.

The clamping jaws 1 (FIGS. 1 and 2) comprise a pair of arms, namely a lower arm 9 and an upper arm 10 pivotally connected to one another at the rear ends thereof. A fork 11 is provided on the arm 10 embracing a projection 12 on the arm 9 and pivotally attached thereto by a pin 13. Another pin 14 (FIG. 2), perpendicular to the pin 13 and protruding from the rear end of the arm 9, is inserted in a hole of the wall 3 of the bracket, to permit the jaws 1 to rotate in a plane substantially perpendicular to the plane where the pivotal movement of the arm 10 relative to the arm 9 takes place. The pin 14 is retained by a spring clip 15.

The cutting and notching jaws 2 (FIGS. 1 and 4) comprise a lower arm 16 which is fastened to the wall 5 and an upper arm 17 whose rear end is pivotally connected to the arm 16 by means of a pin 18. The axis of this pin is substantially parallel to that of the pin 13, to permit pivotal movement of the arm 17, relative to the arm 16, in a plane substantially parallel to that in which the arm 10 moves relative to the arm 9.

A slide 19 (FIGS. 1 to 4) has a protruding tongue 22 integral with a rod 20 actuated by a piston 21 and is longitudinally movable above the jaws 1 and 2. The tongue 22 slides in a slot 23 of the wall 3 and a small wheel 24 (FIGS. 3 and 4), carried by the slide 19, rolls on the surface of the wall 5, to provide transverse guiding during the longitudinal movement of the slide.

The slide 19 has two cams, each essentially in the form of an inclined plane. A first inclined plane 25 (FIGS. 1 to 4) is situated on the lower surface of the slide 19, while a second inclined plane 26 is disposed on one of the sides of the slide 19.

The inclined plane 25 is adapted to coact, on opposite sides of its width, with a pair of small wheels 27 and 28 which are rotatably mounted, by means of pins 29, on the arm 10 of the jaws 1 and on the arm 17 of the jaws 2, respectively. The wheel 28 is slightly nearer to the front part of the corresponding jaws than the wheel 27. Thus, during the forward longitudinal displacement of the slide 19, the cam surface 25 comes into contact with the wheel 27 before the wheel 28.

The inclined plane 26 is adapted to coact with a corresponding roller 30 carried by the arm 10 of clamping jaws 1 and rotatably mounted on a pin 31 (FIGS. 1 and 2), whose axis is substantially perpendicular to the axes of the pins 29 of the wheels 27 and 28, respectively. The position of the roller 30 is such that, upon the aforementioned forward displacement of the slide 19, the roller 30 will come into cooperative contact with the corresponding inclined plane 26 only when the wheel 28, after coacting with the inclined plane 25, has overtaken the latter.

The piston 21 (FIG. 2), which actuates the longitudinal movement of the slide 19, is movable in a chamber 33 of a pneumatic cylinder provided inside the body 8 and is normally held in its rightward end-of-stroke position by a coil spring 34. A chamber 35, provided in the body 8, is connected — through two holes 36 and 37 — with a fitting 38 to which a compressed air line can be attached. A valve stem 39, axially movable in a corresponding hole 40 formed in the body 8, has an annular groove 41 adapted to cooperate with the holes 36 and 37 and with another pair of holes 42 and 43, thereby providing a valve which puts the chamber 35 into communication with either the source of compressed air (valve open) or the atmosphere (valve closed). The stem 39 is held by a coil spring 44 in the valve closed position, but can be opened by a control lever 45 pivotally connected to the body 8 at pin 46.

Two coil springs 50 and 51 (FIGS. 1,2 and 4), disposed between the arms of the jaws 1 and 2 respectively, normally hold the upper arm of each pair of jaws spaced from the corresponding lower arm. A tension spring 53 (FIG. 3) normally holds the clamping jaws 1 against the cutting jaws 2.

The front ends of the arms 9 and 10 of the jaws 1 are slightly bent towards the jaws 2 and are provided with two plane surfaces 54 (FIGS. 3 and 5) lying substantially in the same vertical plane, each of which is adapted to abut against a corresponding blade 55 secured to one of the two arms 16 and 17 of the jaws 2. The clamping jaws 1 have serrated edges 56 and 57 for gripping the wire.

The front end of the arm 16 of the jaws 2 is provided with surfaces 58 and 59 (FIGS. 4 and 5) which form a cutting edge 60 (FIG. 5). The front end of the arm 17 has surfaces 61, 62 (FIGS. 4 and 5) which form a cutting edge 63 (FIG. 5) lying in a plane substantially parallel to that in which the movement of the arm 17 relative to the arm 16 takes place and in which the edge 60 lies. The blades 55 are also provided with cutting edges 64 (FIG. 5); the edge 63 is nearer to the corresponding edge 60 than the edges 64 of the blades 55. The blade 55 of the arm 17 is spaced from the face 61 of this arm 17 to define a substantially U-shaped recess 65.

Preferably, on the front end of the arm 10 of the jaws 1 there is fastened, by means of screws 66 (FIGS. 1,2 and 5) a thin plate 67 which rests upon a thin layer of soft material 68, for instance rubber, cushioning the plate.

A removable casing 69, secured by means of screws 70, encloses the jaws 1 and 2, the cam slide 19 and the other parts described above, leaving exposed solely the front ends of the arms of the jaws.

When the device is in the rest state (which is shown in FIGS. 1 to 5), the jaws 1 and 2 are open and the surfaces 54 of the front ends of the arms of the jaws 1 abut the blades 55 of the jaws 2. Thus, the springs 50 and 51 (FIGS. 1, 2 and 4) urge the upper arms of the jaws away from the lower arms, while the tension spring 53 (FIG. 3) rolls the jaws 1 towards the jaws 2.

The machine can be held with one hand by the operator, while he introduces with the other hand the electric wire or cable to be cut and stripped. FIG. 5 shows an electric cable 71 disposed between the jaws prior to operation of the machine. Then, by actuating the control lever 45 (FIG. 2) with the same hand which holds the machine, the valve stem 39 is caused to slide inside the corresponding hole 40, thereby bringing the groove 41 in correspondence with the two holes 36 and 37. The compressed air will thus push — to the left as shown in FIG. 2 — the piston 21, and the slide 19 which is integral therewith.

Upon displacement of the slide 19, the inclined plane 25 (FIGS. 1 and 2) comes first into cooperative contact with the small wheel 27, thereby partially closing the jaws 1 so that the cable 71 (FIG. 6) is clamped between the faces 56 and 57.

Upon further displacement of the slide 19, the inclined plane 25 (FIGS. 1 and 4) comes into cooperation with the small wheel 28, thereby closing the jaws 2. The cutting edges 60 and 63 shear off the end of the cable 71, whereas the edges 64 of the blades 55 merely cut a notch into the sheath of the cable, as shown in FIG. 7.

Figure 8:
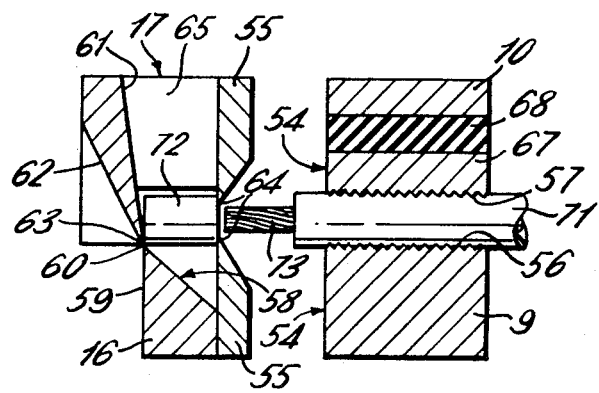

During the last part of the stroke of the slide 19, the inclined plane 26 cooperates with the roller 30 to swing the jaws 1 about the pin 14 away from the jaws 2. The sheath 72 which is held between the arms 16 and 17 of the jaws 2 is thus stripped off by the action of the blades 55, as shown in FIG. 8. The cable 71 is still held by the jaws 1 and has a stripped end portion 73.

Figure 9:
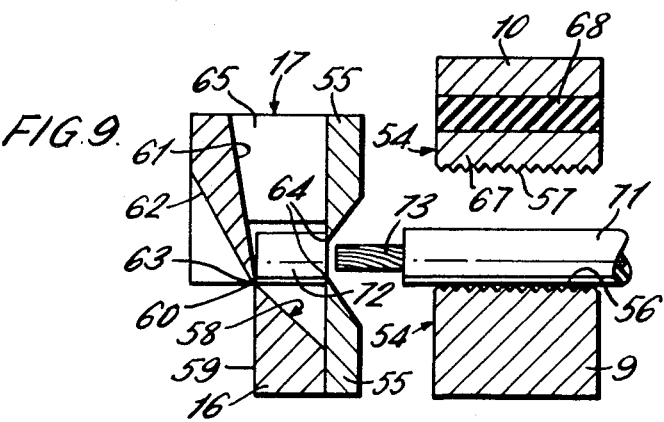

Upon further rotation of the jaws 1, due to the action of the cam 26 cooperating with the roller 30, the small wheel 27 — carried by the arm 10 — will be removed from the lower surface of the cam 19, thereby allowing this arm to spring away from the arm 9 under the action of the spring 50. In this manner, the jaws 1 are opened and the cable 71 can be removed from the machine, as shown in FIG. 9.

All the stages of operation described occur automatically and in a very short time interval. When the lever 45 is released and the chamber 35 is brought in communication with the atmosphere, the spring 34 pushes the piston 21 back to the position shown in FIG. 2, whereupon another cycle can be started. Preferably, on the front side of the casing 69, a pin 74 (FIGS. 1, 2 and 4) can be provided, for supporting the machine, during use, on a corresponding guide (not shown).

I claim:

1. A device for cutting and stripping back sheathed wires or cables, comprising first and second pairs of jaws disposed side by side, said first jaws being adapted to clamp a section of the wire, said second jaws being adapted to cut an end of said wire and to notch the sheath of the wire between said end and the clamped section, one of said pairs of jaws being pivotally mounted relative to the other, so that the one pair is able to be moved away from the other pair substantially in the direction of the axis of the wire or cable clamped in the first jaws, and means for actuating, in succession, the closure of the first jaws, the closure of the second jaws, and the pivotal movement of the one pair of jaws away from the other pair.

2. A device according to claim 1, wherein the actuating means comprise first and second wheels, one of which is rotatably mounted on a jaw of each of said first and second pairs of jaws, and a first cam adapted to coact, in succession, with said first and second wheels of said first and second pairs of jaws, thereby actuating the closure of said jaws, and including spring means for maintaining said jaws normally open.

3. A device according to claim 1, wherein said actuating means comprise a roller rotatably mounted on the pivotally mounted pair of jaws and a cam coacting with said roller to actuate pivotal movement of the pivotally mounted pair of jaws away from the other pair of jaws, and including a spring means for holding said first and second pairs of jaws normally in contact with each other.

4. A device according to claim 2, wherein said actuating means comprise a roller rotatably mounted on the pivotally mounted pair of jaws and a second cam coacting with said roller to actuate pivotal movement of the pivotally mounted pair of jaws away from the other pair of jaws, and including a second spring means for holding said first and second pairs of jaws normally in contact with each other.

5. A device according to claim 4, comprising a pneumatic cylinder including a piston to drive said actuating means, and a control lever which is displaced to actuate said cylinder, and wherein said actuating means comprise a longitudinally movable slide connected to said piston and including said first and second cams.

6. A device according to claim 5, wherein said control lever is disposed parallel to the body of the machine for actuation by one hand of an operator holding the device.

7. A device according to claim 5, wherein the slide is substantially T-shaped, including a leg and cross-member, the cross-member of the slider comprising said first and second cams each of which has substantially the shape of an inclined plane, the leg of the slider being connected through a rod with the piston of the pneumatic cylinder.

8. A device according to claim 7, including a casing of said pneumatic cylinder integral with support means for pivotally mounting one jaw of said one pair of jaws and for securing one jaw of said other pair of jaws.

9. A device according to claim 5, including valve means operable by said control lever for admitting compressed air to said pneumatic cylinder whereby said piston is moved from a rest position toward said jaws, and including spring means for returning said piston to the rest position.

10. A device according to claim 4, wherein said first cam is an inclined plane whose dimensions are so limited relative to said first wheel that the pivotal coaction of said second cam and said roller cause disengagement of said first cam and said first roller, allowing the first pair of jaws to spring open.

11. A device according to claim 1, wherein said second pair of jaws comprise a first pair of active edges to shear the end of the wire or cable, and a second pair of active edges to cut the notch in the sheath of the wire, the edges of the second pair being so spaced from one another that they cut the notch in the sheath when the edges of the first pair shear the wire or cable.

12. A device according to claim 11, wherein said second pair of jaws comprises first and second pairs of blades, said pairs of blades being integral with said first and second pairs of active edges.

13. A device according to claim 11, wherein one jaw of said first pair of jaws comprises a clamping surface mounted on an intermediary pad of yieldable material.

* * * * *